United States Patent [19]

Lenten

[11] Patent Number: 4,887,398
[45] Date of Patent: Dec. 19, 1989

[54] HYDRAULIC BUFFER TO PROTECT BUILDINGS AGAINST EARTHQUAKES

[76] Inventor: Hendrik Lenten, Westersingel 28, Sneek, Netherlands

[21] Appl. No.: 246,538
[22] PCT Filed: Dec. 18, 1987
[86] PCT No.: PCT/EP87/00794
§ 371 Date: Aug. 15, 1988
§ 102(e) Date: Aug. 15, 1988
[87] PCT Pub. No.: WO88/04710
PCT Pub. Date: Jun. 30, 1988

[30] Foreign Application Priority Data

Dec. 22, 1986 [NL] Netherlands .................. 8603259

[51] Int. Cl.⁴ .......................... E04H 9/02; E04B 1/98
[52] U.S. Cl. .................................. 52/167 R; 248/562; 248/636; 248/638
[58] Field of Search .............. 52/167; 248/562, 636, 248/638

[56] References Cited

U.S. PATENT DOCUMENTS

| | | | |
|---|---|---|---|
| 3,137,466 | 6/1964 | Rasmussen | 248/562 |
| 3,141,523 | 7/1964 | Dickie | 248/562 |
| 4,262,886 | 4/1981 | De Salva et al. | 248/562 |
| 4,434,382 | 2/1984 | Patel et al. | 248/638 |
| 4,492,366 | 1/1985 | Ozawa et al. | 248/562 |
| 4,553,744 | 11/1985 | Konishi et al. | 248/562 |
| 4,682,753 | 7/1987 | Clark | 248/636 |
| 4,756,513 | 7/1988 | Carlson et al. | 248/636 |

FOREIGN PATENT DOCUMENTS

| | | | |
|---|---|---|---|
| 0079048 | 4/1982 | European Pat. Off. | |
| 0166276 | 4/1985 | European Pat. Off. | |
| 2118057 | 7/1972 | France | |
| 675136 | 8/1979 | U.S.S.R. | 52/167 |
| 786371 | 11/1957 | United Kingdom | 248/562 |

Primary Examiner—Michael Safavi
Attorney, Agent, or Firm—Kenyon & Kenyon

[57] ABSTRACT

A hydraulic buffer, filled with a compound having the behaviour of a liquid to a certain extent, mounted beneath the foundation of buildings or other structures in order to sustain the structures during earthquakes. The buffer is made from reinforced flexible material and consists of two parallel circular plates (1,2), on the circumference connected to each other by a torus (5), in such a way that the torus and the drum-like space between the circular plates communicate freely, while the axis of the torus is upright, in order to permit the buffer to accommodate relative transverse movement between the circular plates.

3 Claims, 2 Drawing Sheets

HYDRAULIC BUFFER TO PROTECT BUILDINGS AGAINST EARTHQUAKES

BACKGROUND OF THE INVENTION

The invention relates to a hydraulic buffer, filled with a compound that behaves like a liquid to a certain extent, mounted beneath the foundations of buildings and other structures in order to absorb the shocks of severe earthquakes.

SUMMARY OF THE INVENTION

The buffer according to the invention has an envelope made of flexible material, preferably rubber and preferably reinforced by any fabric, and formed with two parallel circular plate portions, separated by a layer of a compound with a liquid behaviour. The circular portions are connected to each other along their circumferences by a hollow torus, in such a way that the interior of the torus and the space between the circular plate portions communicate freely when the torus is mounted with its axis upright. The circular plate portions of flexible material are supported or backed by discs made from any rigid material like steel or aluminum, or by a square concrete plate. When the torus rests on a smooth surface, the lower rigid disc can be omitted in most cases. Furthermore, the envelope is provided with two access nipples, one for introducing the liquid-like compound and the other for venting purposes during filling of the buffer by a special filling device. Each nipple has a shutoff valve (not shown).

The number of buffers, the allowable load, and the hydrostatic pressure inside the buffer depend on the weight of the building under consideration, the construction of the foundation, and the energy absorption capability of the ground beneath the foundation.

The width of the torus should be selected such that the allowable amplitude of ground displacement shall be in accordance with local earthquake design specifications. Although the force shall be assumed to act in any horizontal direction, in most cases horizontal and vertical forces are acting simultaneously. For that reason the design shall also meet the requirement for fluctuating vertical load.

Since in several regulations for earthquake sensitive regions the maximum acting ground displacement is assumed at ninety centimeters, the torus should have at least the same width. In some cases it will be advisable that the buffers for a building or other structure be hydraulically connected to equalize the hydrostatic pressure during and/or after earthquakes. This is especially an advantage when permanent displacements remain.

It is an object of the invention to provide a safety device to protect buildings and other structures from damage and collapse during earthquakes that often result in disasters at the cost of many victims and much money.

The advantage of the invention when it is compared with existing safety devices, serving the same purpose and already known, are the uniform load, the large range of allowable ground displacement, the extremely low forces in the flexible parts of the buffer, resulting in a long rated life, a low resistance of the torus against the acting ground displacements during earthquakes, the self level adjusting capability, and the simplicity of the design.

BRIEF DESCRIPTION OF THE DRAWINGS

One embodiment of the invention will be explained, by way of example, with reference to the accompanying drawing, in which.

DETAILED DESCRIPTION OF THE PREFERRED EMBODIMENT

Figure 1:
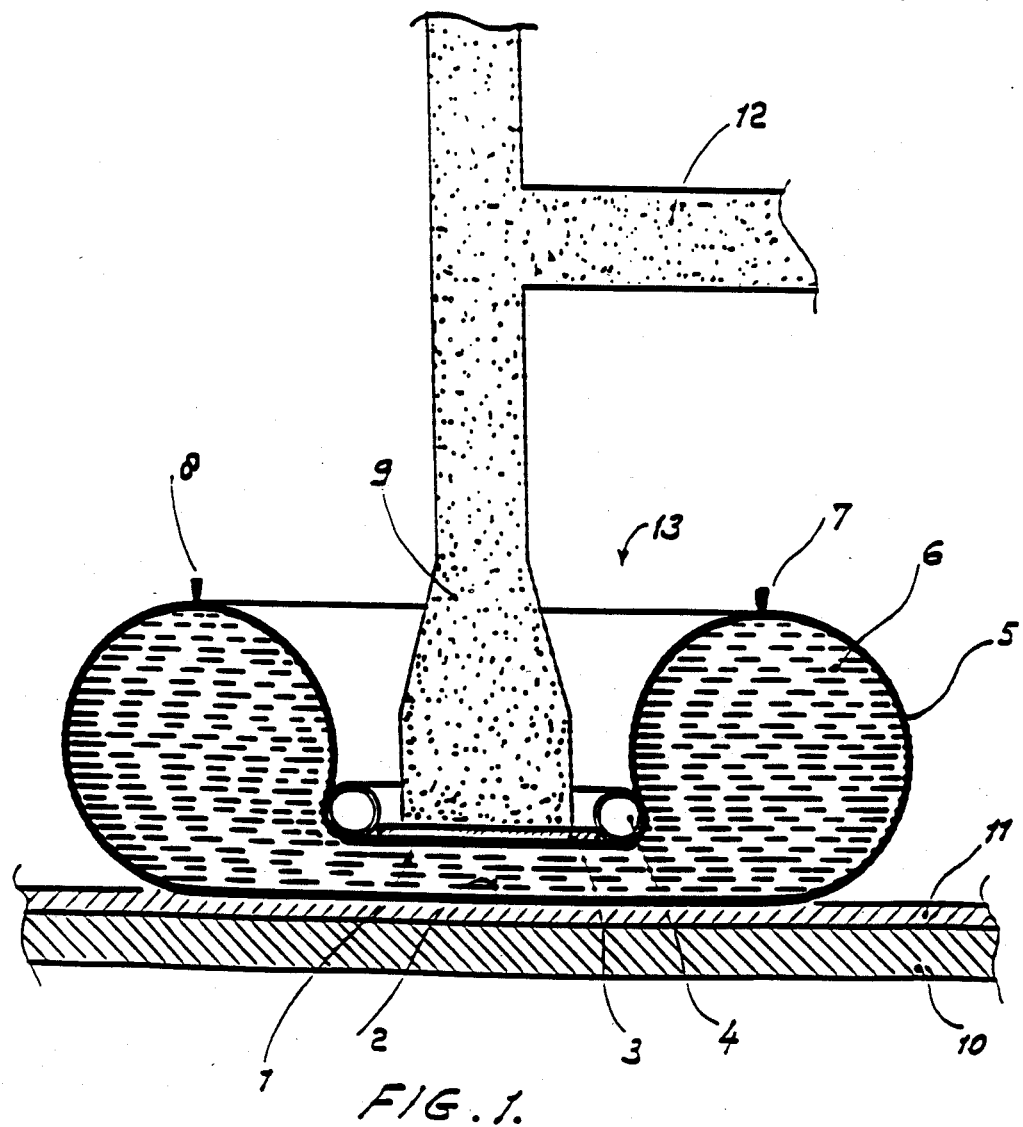
FIG. 1 is an elevation view, in cross section, of the hydraulic buffer assembly.
Figure 3:
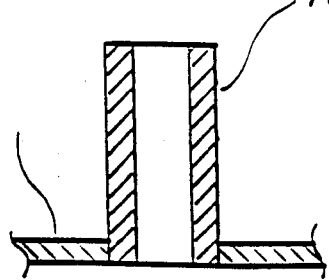
FIG. 3 is a detail of one of the access nipples.
Figure 2:
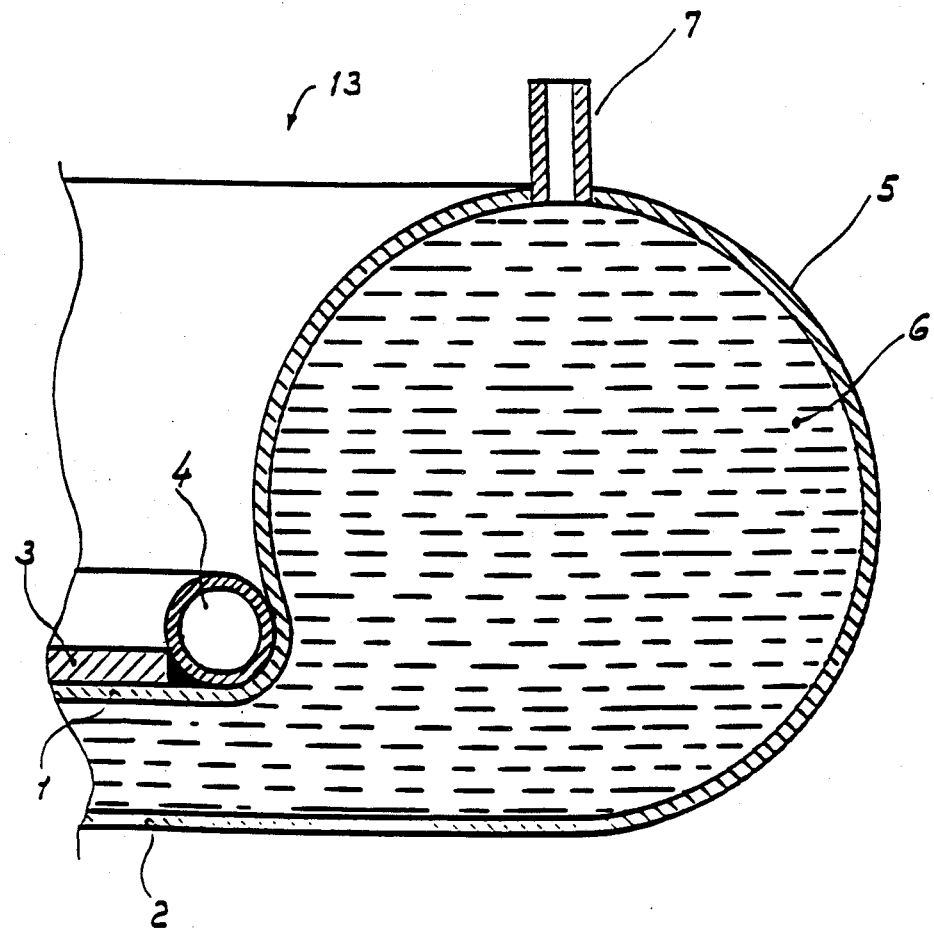
FIG. 2 represents a detail, at an enlarged scale, of a portion of the hydraulic buffer.

With reference to the figures, the preferred embodiment of the hydraulic buffer includes an impervious envelope 13 made of flexible material. The material is preferably rubber or rubber-like. Desirably, the torus is reinforced by metal wire or bars, radially inserted in the flexible material, in such a way that the final flexibility is not affected by the reinforcement. The envelope includes a first circular upper plate portion 1 and a second circular base plate portion 2 spaced from and coaxial with the first circular portion. A hollow torus 5 coaxially surrounds and is connected to the first and second circular plate portions to form a continuous surface.

When the buffer is loaded under normal conditions, the upper circular plate portion 1 is parallel to the lower circular plate portion 2, while the flexible material of the upper circular plate portion 1 is covered and supported or backed by the metal disc 3, to the circumference of which is welded a toroidal tube 4, intended to achieve a gradual transition from the circular portion 1 into the torus 5 for avoiding damage to the neck of the torus.

The liquid-like compound 6, preferably oil or fresh water or a compound of several materials behaving as a liquid, must be pumped into the buffer through the access nipple 7, and the trapped air can escape through the nipple 8. During pumping of the liquid-like compound 6 into the buffer, the torus 5 becomes full-shaped first. As more liquid-like compound 6 is pumped into the buffer, the upper circular plate portion 1 together with the metal disc 3 become lifted, and consequently the foundation support 9 also. The required quantity of liquid-like compound depends on the distance between the circular plates 1 and 2 necessary to avoid direct contact during tilting when the earth at the spot is in motion. In order to avoid damaging the lower circular plate portion 2, the ground 10 shall be smoothly finished by means of a layer of bitumen 11, of rubber, or otherwise.

In some cases special cross beams 12 will be necessary to give sufficient support to the foundation in horizontal directions. Shock absorption in vertical directions is also possible if the torus 5 is partially filled with inert gas, which is to be considered when the energy absorption capability of the ground should be insufficient.

Another advantage of the invention not mentioned yet is the very small distance needed between the bottom of the foundation and the ground, only enough to pass the diameter of the toroidal tube plus the thickness of the circular plate portions, when the buffer is being installed in its final position. That means a minimum of excavation when the buffer is installed under existing buildings and other structures. In general, the thickness of the liquid layer between both circular plate portions shall be such as to avoid direct contact of the plates when tilting, caused by local subsidence, sometimes occurs during severe earthquakes.

During earthquakes the ground displacements affect the volume of the torus; it becomes smaller. This is immediately compensated by enlarging the distance between the circular plates. That produces a slight damping of the tremors and also forces the building under consideration to return to its original position when the earthquakes have passed. Sometimes the above mentioned behaviour of the hydraulic buffer can be a reason to fill the buffer partly with an inert gas. In that case the buffer is also effective in vertical directions and the applied load due to dead-load plus earthquake load, sometimes equal to one g, is more gradually absorbed by the buffer, especially by the torus. The buffer according to the invention is also applicable for shock absorption in general.

Additional preferred features of the invention include a lid-like organ (not shown) to protect the buffer from damage caused by falling objects, reinforcement of the base plate portion of the buffer by metal wire or strips or metal inserts. In addition, the buffer may include a known device, such as a coil spring, to compensate for vertical ground displacements, in such a way that the compensating elements are connected to the upper circular plate portion of the buffer according to the invention. Further, a certain number of balls may be placed between the upper and lower plate portions, in such a way that under normal conditions the upper plate portion does not have any point of contact with the balls. The balls become effective only when the buffer envelope is leaking, avoiding collapse of the supported part of the building.

I claim:

1. A hydraulic buffer for absorbing large transverse displacements between a supporting surface and a structure, the buffer comprising:
    an impervious envelope made of flexible material, the envelope including a first circular upper plate portion, a second circular base plate portion spaced from and coaxial with the first circular plate portion, and a hollow torus having a wall coaxially surrounding and connecting the first and second circular plate portions, the wall of the torus and the first and second plate portions forming a continuous surface, and the hollow interior of the torus communicating freely with the space between the first and second plate portions;
    a liquid-like material filling the space between the first and second plate portions and at least partially filling the hollow torus; and
    a rigid disc placed on the flexible material of the first circular upper plate portion to provide a bearing surface for the structure, the disc having a rounded circumferential edge to provide a smooth transition from the circumference of the upper plate portion to the connecting wall of the torus.

2. A hydraulic buffer according to claim 1 wherein the liquid-like material is oil.

3. A hydraulic buffer according to claim 1 wherein the liquid-like material is pure water.

* * * * *